(12) United States Patent
Sander (10) Patent No.: US 10,258,842 B2
(45) Date of Patent: Apr. 16, 2019

(54) GOLF CLUB HEAD INCLUDING MECHANICAL AND ADHESIVE JOINTS

(71) Applicant: Karsten Manufacturing Corporation, Phoenix, AZ (US)

(72) Inventor: Raymond J. Sander, Benbrook, TX (US)

(73) Assignee: Karsten Manufacturing Corporation, Phoenix, AZ (US)

( * ) Notice: Subject to any disclaimer, the term of this patent is extended or adjusted under 35 U.S.C. 154(b) by 0 days.

(21) Appl. No.: 14/961,185

(22) Filed: Dec. 7, 2015

(65) Prior Publication Data

US 2017/0157474 A1 Jun. 8, 2017

(51) Int. Cl.

| A63B 53/04 | (2015.01) |
|---|---|
| B29C 65/00 | (2006.01) |
| B29C 65/58 | (2006.01) |
| B29C 65/72 | (2006.01) |
| B29C 65/56 | (2006.01) |
| B21K 17/00 | (2006.01) |

(Continued)

(52) U.S. Cl.
CPC ...... *A63B 53/0475* (2013.01); *A63B 53/0466* (2013.01); *A63B 60/52* (2015.10); *A63B 2053/045* (2013.01); *A63B 2060/002* (2015.10); *A63B 2209/00* (2013.01); *B21K 17/00* (2013.01); *B29C 65/565* (2013.01); *B29C 65/58* (2013.01); *B29C 65/72* (2013.01); *B29C 66/1182* (2013.01); *B29C 66/124* (2013.01)

(58) Field of Classification Search
CPC ....... A63B 53/04; B29C 65/565; B29C 65/58; B29C 65/72; B29C 65/7844; B29C 66/05; B29C 66/10; B29C 66/12; B29C 66/1182; B29C 66/12261; B29C 66/124; B29C 66/1244; B29C 66/124435; B29C 66/137; B29C 66/3032
USPC ................. 473/345, 335, 336, 375
See application file for complete search history.

(56) References Cited

U.S. PATENT DOCUMENTS

| 5,410,798 A * | 5/1995 | Lo .......................... A63B 53/04 264/241 |
|---|---|---|
| 5,670,109 A * | 9/1997 | DeRees ................... B29C 66/54 156/304.5 |
| 5,924,932 A | 7/1999 | Taylor |

(Continued)

FOREIGN PATENT DOCUMENTS

JP 2011167520 A 9/2011

*Primary Examiner* — William Pierce (57) ABSTRACT

A golf club head includes a metallic section, a polymeric section, and an adhesive material. The metallic section defines an opening and the polymeric section extends over the opening. The adhesive material is disposed between the metallic section and the polymeric section to form an adhesive joint therebetween. The adhesive joint has an adhesive retaining strength configured to inhibit the polymeric section from being detached from the metallic section when the adhesive material is at least partially cured. The metallic section and the polymeric section are also mechanically engaged with one another to form a mechanical joint therebetween having a mechanical retaining strength configured to inhibit the polymeric section from being detached from the metallic section. The adhesive retaining strength of the adhesive joint, alone, is greater than the mechanical retaining strength of the mechanical joint, alone, only when the adhesive material is at least partially cured.

20 Claims, 6 Drawing Sheets

(51) Int. Cl.
*A63B 60/52* (2015.01)
*A63B 60/00* (2015.01)

(56) References Cited

U.S. PATENT DOCUMENTS

| | | | |
|---|---|---|---|
| 6,050,904 A | 4/2000 | Kuo | |
| 6,248,025 B1* | 6/2001 | Murphy | A63B 53/04 473/324 |
| 6,354,962 B1* | 3/2002 | Galloway | A63B 53/02 473/342 |
| 6,374,570 B1* | 4/2002 | McKague, Jr. | B29C 65/56 52/762 |
| 6,471,604 B2* | 10/2002 | Hocknell | A63B 53/02 473/334 |
| 6,565,452 B2* | 5/2003 | Helmstetter | A63B 53/02 473/324 |
| 6,602,149 B1* | 8/2003 | Jacobson | A63B 53/04 473/329 |
| 6,743,118 B1* | 6/2004 | Soracco | A63B 53/0466 473/324 |
| 6,805,643 B1 | 10/2004 | Lin | |
| 6,974,393 B2* | 12/2005 | Caldwell | A63B 53/0466 273/DIG. 7 |
| 7,025,692 B2* | 4/2006 | Erickson | A63B 53/0466 473/335 |
| 7,082,665 B2* | 8/2006 | Deshmukh | A63B 53/0466 29/469 |
| 7,318,782 B2* | 1/2008 | Imamoto | A63B 53/04 473/345 |
| 7,371,304 B2* | 5/2008 | Christman | B29C 65/00 156/293 |
| 7,393,488 B2* | 7/2008 | Grose | B29C 65/527 264/254 |
| 7,475,541 B2* | 1/2009 | Ibaraki | F01K 23/065 60/618 |
| 7,601,078 B2* | 10/2009 | Mergy | A63B 53/0466 473/345 |
| 7,658,686 B2* | 2/2010 | Soracco | A63B 53/0466 473/342 |
| 7,803,065 B2* | 9/2010 | Breier | A63B 53/04 473/334 |
| 7,993,216 B2* | 8/2011 | Lee | A63B 53/0466 473/334 |
| 8,388,464 B2 | 3/2013 | Gilbert et al. | |
| 8,529,370 B1* | 9/2013 | Galloway | A63B 53/0466 473/347 |
| 8,864,604 B2* | 10/2014 | Matsunaga | A63B 53/00 473/346 |
| 8,870,680 B2* | 10/2014 | Yamamoto | A63B 53/0466 473/345 |
| 9,033,822 B1* | 5/2015 | DeMille | A63B 53/0466 473/345 |
| 9,504,883 B2* | 11/2016 | DeMille | A63B 53/0466 |
| 9,808,682 B2* | 11/2017 | DeMille | A63B 53/0466 |
| 9,861,866 B2* | 1/2018 | DeMille | A63B 53/0466 |
| 9,925,432 B2* | 3/2018 | Morales | A63B 53/0475 |
| 2001/0055995 A1* | 12/2001 | Cackett | A63B 53/02 473/342 |
| 2002/0142861 A1* | 10/2002 | Helmstetter | A63B 53/02 473/342 |
| 2002/0187853 A1* | 12/2002 | Beach | A63B 53/0466 473/345 |
| 2003/0100381 A1* | 5/2003 | Murphy | A63B 53/02 473/342 |
| 2004/0033844 A1* | 2/2004 | Chen | A63B 53/0466 473/329 |
| 2004/0113483 A1 | 6/2004 | Sylvester et al. | |
| 2004/0116207 A1* | 6/2004 | De Shiell | A63B 53/0466 473/345 |
| 2004/0185960 A1* | 9/2004 | Chen | A63B 53/04 473/342 |
| 2005/0043115 A1* | 2/2005 | Lin | A63B 53/0466 473/345 |
| 2005/0119068 A1* | 6/2005 | Onoda | A63B 53/0466 473/342 |
| 2005/0119070 A1* | 6/2005 | Kumamoto | A63B 53/0466 473/345 |
| 2005/0173044 A1* | 8/2005 | Drummond | B01D 53/268 156/69 |
| 2005/0215350 A1* | 9/2005 | Reyes | A63B 53/0466 473/344 |
| 2005/0215354 A1* | 9/2005 | Kumamoto | A63B 53/0466 473/349 |
| 2005/0266933 A1* | 12/2005 | Galloway | A63B 53/0466 473/342 |
| 2005/0272526 A1* | 12/2005 | Hsu | A63B 53/0466 473/345 |
| 2005/0272527 A1* | 12/2005 | Sugimoto | A63B 53/0466 473/345 |
| 2006/0019770 A1* | 1/2006 | Meyer | A63B 53/0466 473/349 |
| 2006/0073910 A1* | 4/2006 | Imamoto | A63B 53/0466 473/345 |
| 2006/0079349 A1* | 4/2006 | Rae | A63B 53/0466 473/345 |
| 2006/0217216 A1* | 9/2006 | Iizuka | A63B 53/0466 473/349 |
| 2006/0240908 A1* | 10/2006 | Adams | A63B 53/0466 473/334 |
| 2007/0054751 A1* | 3/2007 | Breier | A63B 53/04 473/334 |
| 2007/0060414 A1* | 3/2007 | Breier | A63B 53/04 473/350 |
| 2007/0117653 A1 | 5/2007 | Yoneyama | |
| 2007/0207877 A1* | 9/2007 | Nishio | A63B 53/0466 473/345 |
| 2008/0053613 A1* | 3/2008 | Wang | B29C 65/58 156/331.1 |
| 2008/0058119 A1* | 3/2008 | Soracco | A63B 53/04 473/350 |
| 2008/0102976 A1* | 5/2008 | Chen | A63B 43/02 473/305 |
| 2008/0261715 A1* | 10/2008 | Carter | A63B 53/0466 473/291 |
| 2009/0088272 A1* | 4/2009 | Foster | A63B 53/0466 473/350 |
| 2010/0105499 A1* | 4/2010 | Roach | A63B 53/04 473/335 |
| 2010/0323812 A1* | 12/2010 | Boyd | A63B 53/0466 473/329 |
| 2012/0064991 A1* | 3/2012 | Evans | A63B 53/0466 473/335 |
| 2012/0071258 A1* | 3/2012 | Yamaguchi | A63B 53/00 473/287 |
| 2012/0157224 A1 | 6/2012 | Finn et al. | |
| 2012/0172147 A1* | 7/2012 | McDonnell | A63B 53/0466 473/346 |
| 2013/0129409 A1* | 5/2013 | Cho | B29C 65/4835 403/266 |
| 2013/0178305 A1 | 7/2013 | Beno et al. | |
| 2013/0178306 A1* | 7/2013 | Beno | A63B 53/0466 473/307 |
| 2013/0217514 A1* | 8/2013 | Sugimoto | A63B 53/0466 473/345 |
| 2014/0198511 A1* | 7/2014 | Cejnek | F21V 17/101 362/487 |
| 2015/0119165 A1 | 4/2015 | Sander | |
| 2016/0332040 A1* | 11/2016 | Lafortune | A63B 53/04 |
| 2016/0346640 A1* | 12/2016 | Boggs | A63B 53/0466 |

* cited by examiner

GOLF CLUB HEAD INCLUDING MECHANICAL AND ADHESIVE JOINTS

TECHNICAL FIELD

The present invention relates generally to a golf club head including a combination of a mechanical joint and an adhesive joint.

BACKGROUND

A golf club may generally include a club head disposed on the end of an elongate shaft. During play, the club head may be swung into contact with a stationary ball located on the ground in an effort to project the ball in an intended direction and with a desired vertical trajectory.

Many design parameters must be considered when forming a golf club head. For example, the design must provide enough structural resilience to withstand repeated impact forces between the club and the ball, as well as between the club and the ground. The club head must conform to size requirements set by different rule setting associations, and the face of the club must not have a coefficient of restitution above a predefined maximum (measured according to applicable standards). Assuming that certain predefined design constraints are satisfied, a club head design for a particular loft can be quantified by the magnitude and location of the center of gravity, as well as the head's moment of inertia about the center of gravity and/or the shaft.

The club's moment of inertia relates to the club's resistance to rotation (particularly during an off-center hit), and is often perceived as the club's measure of "forgiveness." In typical club designs, high moments of inertia are desired to reduce the club's tendency to push or fade a ball. Achieving a high moment of inertia generally involves moving mass as close to the perimeter of the club as possible (to maximize the moment of inertia about the center of gravity), and as close to the toe as possible (to maximize the moment of inertia about the shaft). In iron-type golf club heads, this desire for increased moments of inertia have given rise to designs such as the cavity-back club head and the hollow club head.

While the moment of inertia affects the forgiveness of a club head, the location of the center of gravity behind the club face (and above the sole) generally affects the trajectory of a shot for a given face loft angle. A center of gravity that is positioned as far rearward (away from the face) and as low (close to the sole) as possible typically results in a ball flight that has a higher trajectory than a club head with a center of gravity placed more forward and/or higher.

While a high moment of inertia is obtained by increasing the perimeter weighting of the club head or by moving mass toward the toe, an increase in the total mass/swing weight of the club head (i.e., the magnitude of the center of gravity) has a strong, negative effect on club head speed and hitting distance. Said another way, to maximize club head speed (and hitting distance), a lower total mass is desired; however a lower total mass generally reduces the club head's moment of inertia (and forgiveness).

In the tension between swing speed (mass) and forgiveness (moment of inertia), it may be desirable to place varying amounts of mass in specific locations throughout the club head to tailor a club's performance to a particular golfer or ability level. In this manner, the total club head mass may generally be categorized into two categories: structural mass and discretionary mass.

Structural mass generally refers to the mass of the materials that are required to provide the club head with the structural resilience needed to withstand repeated impacts. Structural mass is highly design-dependent, and provides a designer with a relatively low amount of control over specific mass distribution. On the other hand, discretionary mass is any additional mass that may be added to the club head design for the sole purpose of customizing the performance and/or forgiveness of the club. In an ideal club design, the amount of structural mass would be minimized (without sacrificing resiliency) to provide a designer with a greater ability to customize club performance, while maintaining a traditional or desired swing weight.

SUMMARY

A golf club head includes a metallic section and a polymeric section. The metallic section includes a face and the metallic section defines an opening. The polymeric section extends over the opening and is adhered to the metallic section to form an adhesive joint therebetween. The adhesive joint has an adhesive retaining strength that is configured to inhibit the polymeric section from being detached from the metallic section. The metallic section and the polymeric section are physically engaged with one another to form a mechanical joint therebetween. The mechanical joint has a mechanical retaining strength configured to inhibit the polymeric section from being detached from the metallic section. The adhesive retaining strength of the adhesive joint is greater than the mechanical retaining strength of the mechanical joint.

In another aspect of the disclosure, a golf club head includes a forward section, a body, and an adhesive material. The forward section includes a face. The body is bonded to the forward section and includes a first polymeric section and a second polymeric section. The adhesive material is disposed between a portion of the first polymeric section and the second polymeric section to form an adhesive joint therebetween. The adhesive joint has an adhesive retaining strength configured to inhibit the first polymeric section from being detached from the second polymeric section when the adhesive material is at least partially cured. The first polymeric section and the second polymeric section are mechanically engaged with one another to form a mechanical joint therebetween having a mechanical retaining strength configured to inhibit the first polymeric section from being detached from the second polymeric section. The adhesive retaining strength of the adhesive joint is greater than the mechanical retaining strength of the mechanical joint when the adhesive material is at least partially cured.

The golf club head is provided with a mechanical joint having a mechanical retaining strength that is not otherwise configured to withstand the loads and forces associated with impact between the golf club head and a golf ball, while still ensuring that the polymeric section and the metallic section are mechanically secured together until a sufficient cure time has passed and the adhesive material is at least partially cured. Therefore, the mechanical joint is configured with withstand the rigors shipment of the golf club head, subsequent manufacturing steps, and the like, when the adhesive material is not yet at least partially cured. Thus, the golf club head can be manufactured more quickly and/or be manufactured without having to use fixtures to hold the polymeric section relative to the metallic section, while waiting for the adhesive material to cure.

The above features and advantages and other features and advantages of the present technology are readily apparent

DETAILED DESCRIPTION

Figure 1:
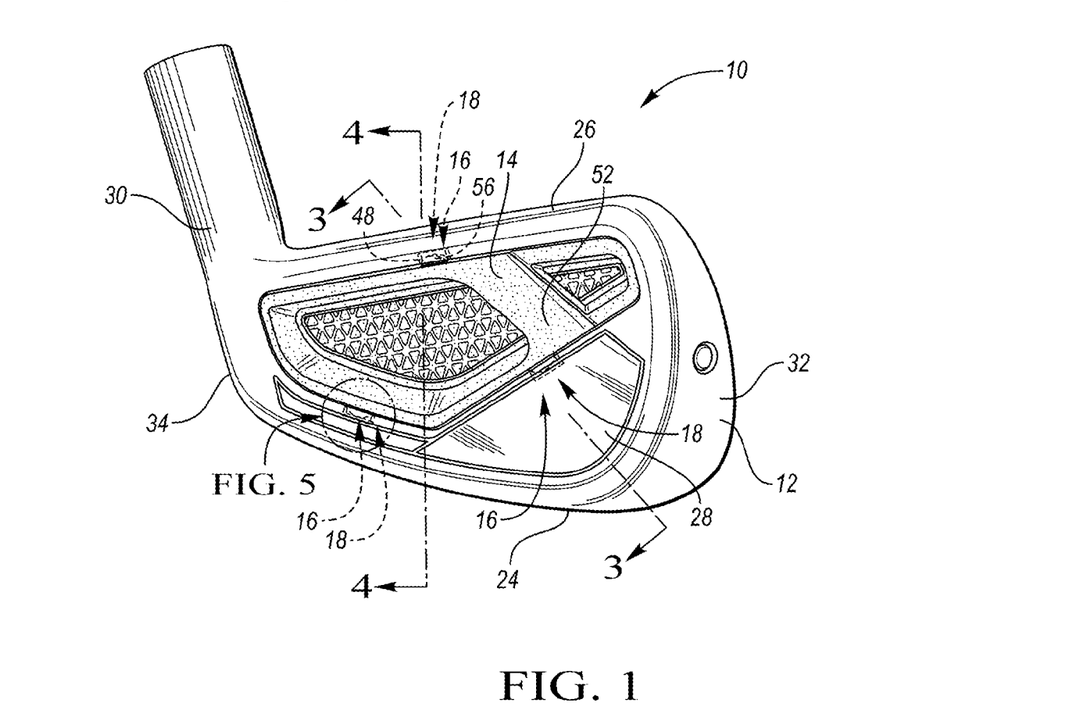
FIG. 1 is a schematic perspective view of the rear portion of an iron-type, hollow golf club head.
Figure 2:
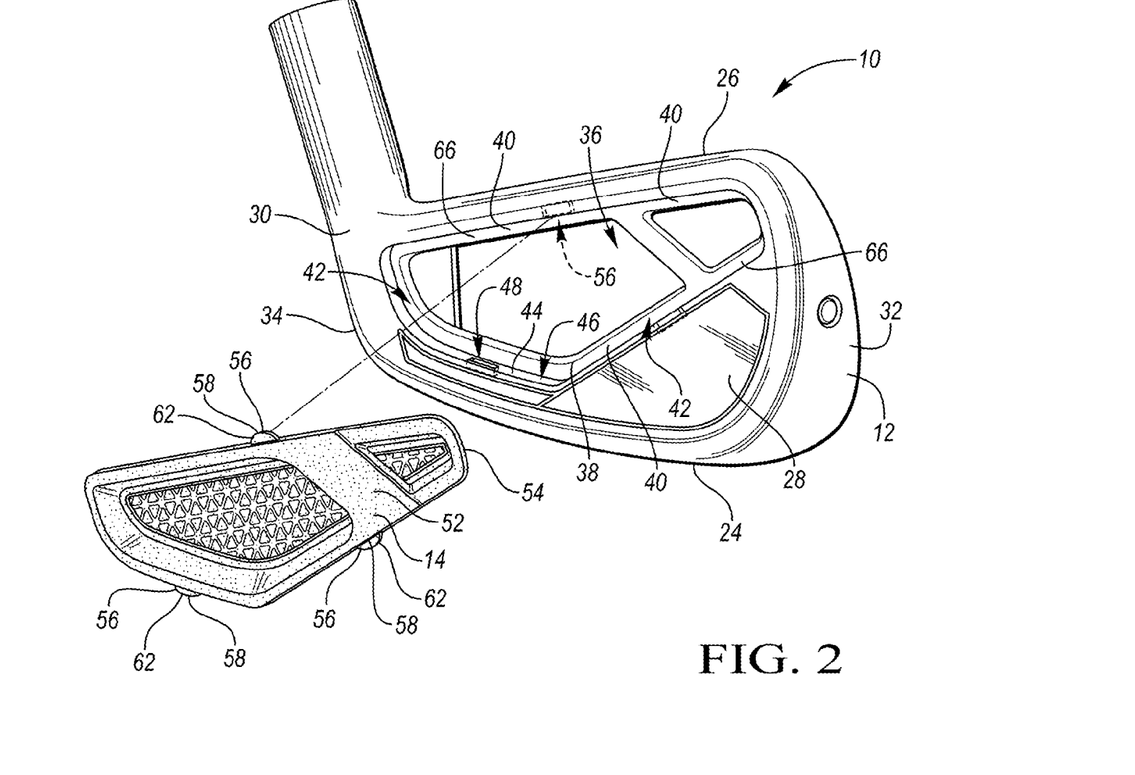
FIG. 2 schematic perspective view of the rear portion of the golf club head of FIG. 1, with the face removed.
Figure 3:
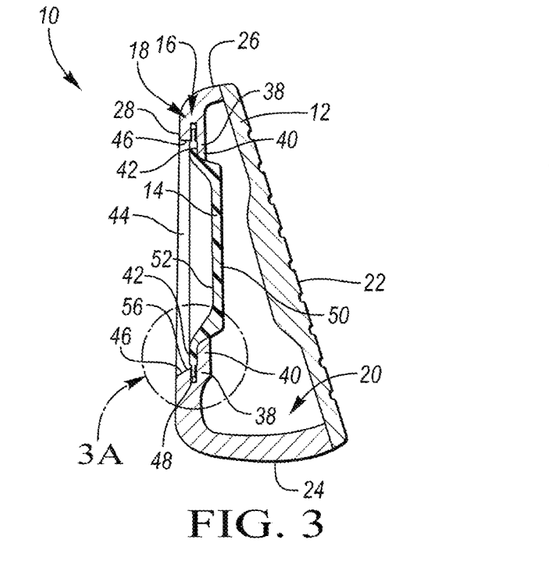
FIG. 3 is a schematic cross-sectional view of the golf club head of FIG. 1, taken along line 3-3.

Referring to the drawings, wherein like reference numerals are used to identify like or identical components in the various views, FIGS. 1 and 2 schematically illustrate a hollow golf club head 10 that includes a forward or metallic section ("metallic section 12") and a body or polymeric section ("polymeric section 14"). The metallic section 12 defines an opening 36. The polymeric section 14 covers the opening 36 and is attached to the metallic section 12 such that at least one mechanical joint 16 and at least one adhesive joint 18 is formed between the sections 12, 14. Referring to FIG. 3, a closed internal cavity 20 is defined between the metallic section 12 and the polymeric section 14.

Figure 4:
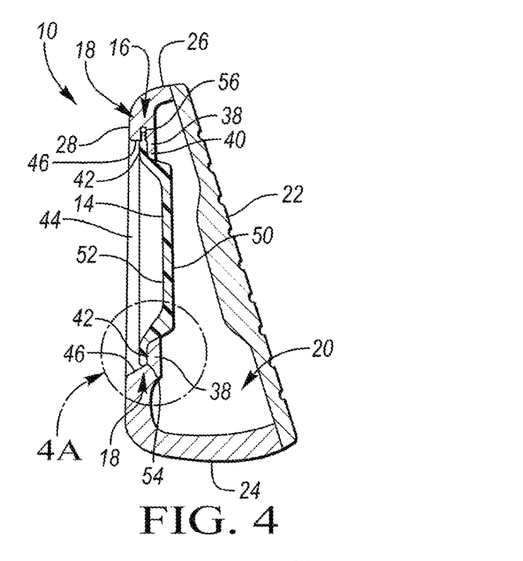
FIG. 4 is a schematic perspective view of the golf club head of FIG. 1, taken along line 4-4.

Referring now to FIGS. 2-4, the metallic section 12 includes a face 22, a lower portion ("sole 24"), an upper portion ("topline 26"), a rear wall 28, and a hosel 30. Referring specifically to FIGS. 3 and 4, the sole 24 extends on an underside of the club head 10 from a toe portion 32 to a heel portion 34 and extends between the face 22 and the rear wall 28. As such, the sole 24 is configured to contact the ground when the club head 10 is held in a neutral hitting position. The rear wall 28 of the face 22 extends between the bole 24 and the topline 26, with the rear wall 28 extending opposite the face 22.

The topline 26 is disposed in spaced relationship to the sole 24. The topline 26 extends from the toe portion 32 to the heel portion 34, between the face 22 and the rear wall 28. The topline 26 provides structural support or reinforcement for the face 22.

The metallic section 12 is formed from a metallic material, through any suitable process, including, for example, stamping, forging, or casting. Additionally, the face 22 may either be integrally formed with the metallic section 12, or else, may be separately fabricated and affixed to the metallic section 12 through, for example, welding, brazing, or gluing. The metallic section 12 may be formed from a metal or metal alloy, including, for example, alloys of steel (e.g., AISI type 1020 or AISI type 8620 steel), stainless steel (e.g., AISI type 304, AISI type 431, or AISI type 630 stainless steel) or titanium (e.g., Ti-6Al-4V Titanium alloy), however other metal alloys, metal amorphous alloys, and/or non-metallic materials known in the art may similarly be used.

In one configuration, the polymeric section 14 may include a polymeric material having a yield strength that is great enough to withstand the repeated stresses imparted by the ball impact with the face 22 of the metallic section 12. Examples of such material may include one or more polyamides, polyimides, polyamide-imides, polyetheretherketones (PEEK), polycarbonates, engineering polyurethanes, and/or other similar materials. In general, the polymeric material may be either thermoplastic or thermoset. In one configuration, a suitable material may be a structural polymer that has a tensile strength of at least about 180 MPa (according to ASTM D638), while in other configurations it may have a tensile strength of at least about 220 MPa. For example, in one configuration, the polymeric material may be an aliphatic polyamide that is filled with a carbon filler material, such as chopped carbon fiber. Further, in one configuration, a suitable material may be a structural polymer that has a tensile modulus of at least 25,000 MPa (according to ASTM D638), while in other configurations it may have a tensile modulus of at least 30,000 MPa.

With reference to FIGS. 3, 3A, 4, 4A, 5, the polymeric section 14 is adhered to the metallic section 12 with an adhesive material 68 that is curable, such that the adhesive joint 18 is formed therebetween. The adhesive joint 18 exhibits an adhesive retaining strength configured to inhibit the polymeric section 14 from being detached from the metallic section 12. The adhesive material 68 is curable, such that the adhesive retaining strength of the adhesive joint 18 increases as a function of the amount of cure of the adhesive material 68.

However, in general, while polymers may provide weight saving advantages, certain polymers, such as polyamides, may be difficult to adhere due to their low surface energies. Therefore, an adhesive material 68 having a long cure time may be required in order to achieve an adhesive retaining strength that is suitable to prevent the polymeric section 14 from being detached from the metallic section 12. Further, a fixture may be required to hold the polymeric section 14 in position relative to the metallic section 12 until the suitable adhesive retaining strength is achieved, thus increasing the amount of time to assemble the club head 10. The present design addresses this adhesion problem, however, by incorporating a physical engagement of the polymeric section 14 with the metallic section 12 to form the mechanical joint 16 therebetween. As will be explained in more detail below, the mechanical joint 16 may be formed via at least one type of mechanical attachment, e.g., interference fit, clip, detent, dowel pin, etc. The mechanical joint 16 exhibits a mechanical retaining strength that is also configured to inhibit the polymeric section 14 from being detached from the metallic section 12.

Figure 3A:
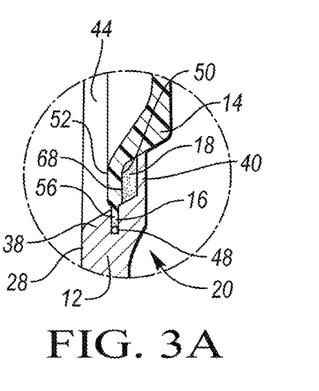
FIG. 3A is a schematic enlarged perspective view of the area marked "FIG. 3A" provided in FIG. 3.
Figure 4A:
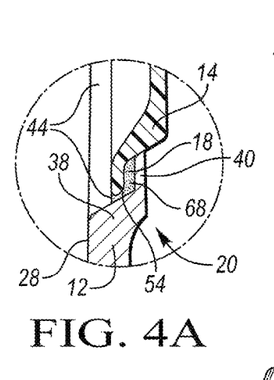
FIG. 4A is a schematic perspective view of the area marked "FIG. 4A" provided in FIG. 4.

Referring now to FIGS. 3A and 4A, the adhesive material 68 is disposed between the metallic section 12 and the polymeric section 14 to form the adhesive joint therebetween. Since the adhesive retaining strength of the adhesive joint 18 increases as a function of the amount of cure of the adhesive material 68, the mechanical retaining strength of the mechanical joint 16, alone, is greater than the adhesive retaining strength of the adhesive joint 18, alone, only until the adhesive material 68 is partially cured, as will be explained in more detail below. Hence, once the adhesive material 68 is partially cured, the adhesive retaining strength of the adhesive joint 18, alone, is sufficient to prevent the polymeric section 14 from being detached from the metallic section 12.

The adhesive material 68 may include any substance that cures, or otherwise hardens, to adhere to both the polymeric section 14 and the metallic section 12, while also binding the polymeric section 14 to the metallic section 12 to form the adhesive joint 18. The adhesive material 68 is suitable to bond with both the metallic material of the metallic section 12 and the polymeric material of the polymeric section 14, to form the adhesive joint 18. Such an adhesive material 68 may include epoxy adhesives, methacrylate adhesives, urethane adhesives, and the like. By way of a non-limiting example, the adhesive material may include a two-part acrylic epoxy such as DP-810, available from the 3M Company of St. Paul, Minn. While most adhesives will readily bond to metals, typical bond strengths to polymers are comparatively lower, since such polymers may have lower surface energy.

In one embodiment, in order to improve an adhesive bonding strength of the adhesive material 68 with the polymeric material of the polymeric section 14, the polymeric section 14 may be pre-treated prior to assembly. Surface modification techniques may be used to change the chemical composition of the surface of the polymeric section 14 to increase the surface energy and allow a broader number of adhesives to be considered. These techniques may include flame, corona or plasma treatment, acid etching or use of solvent based adhesion promoters that contain higher surface energy resins which entangle with the low surface energy substrate when the solvent swells the surface. Once the surface is modified it is easier for the adhesive material 68 to flow out on or wet the treated surface and make a suitable bond.

As already mentioned, the adhesive material 68 requires curing for over a duration of time (i.e., a cure time) until the adhesive material 68 is at least partially cured, before the polymeric section 14 is inhibited from being detached from the metallic section 12. Hence, the mechanical retaining strength of the mechanical joint 16, alone, is sufficient to inhibit the polymeric section 14 from being detached from the metallic section 12, while the adhesive material 68 cures. As such, the mechanical joint 16 exhibits a mechanical retaining strength that is sufficient to prevent the polymeric section 14 from being detached from the metallic section 12, while the golf club head 10 is being assembled, shipped, and the like. Therefore, the mechanical joint 16 is configured to provide the functionality of fixtures, jigs, clamps, and the like, that may otherwise be used during manufacture of the golf club head 10 to prevent the polymeric section 14 from being detached from, or otherwise moved relative to, the metallic section 12, during assembly.

The point in time when the adhesive retaining strength of the adhesive material 58, alone, is partially cured is the point in time when the polymeric section 14 is prevented from being detached from the metallic section 12, irrespective of the mechanical retaining strength provided by the mechanical joint 16. Therefore, the point in time when the adhesive material 68 has partially cured (e.g., 15 minutes, 2 hours, etc.) is the point in time when the adhesive retaining strength of the adhesive joint 18 has increased to be at least equal to the mechanical retaining strength of the mechanical joint 16.

Further, the adhesive material 68 continues to cure from the point in time of being partially cured to a point in time when the adhesive retaining strength of the adhesive material 68 increases to achieve a working strength and, eventually, increases to achieve the strength of a full cure. The working strength of the adhesive material 68 is defined as being when the adhesive material 68 reaches a strength that is sufficient for the club head 10 to withstand a load experienced when impacting the face 22 of the golf club head 10 with a golf ball at a desired swing speed, such that the polymeric section 14 is not detached from the metallic section 12. As such, when the adhesive retaining strength of the adhesive material 68 is at least equal to the working strength, the adhesive retaining strength, alone, is sufficient to withstand a load experienced between the face 22 of the golf club head 10 and a golf ball, at the desired swing speed of at least 150 miles per hour (mph). More preferably, the adhesive retaining strength, alone, is sufficient to withstand a load experienced between the face 22 of the golf club head 10 and a golf ball at the desired swing speed of at least 95 mph. Even more preferably, the adhesive retaining strength, alone, is sufficient to withstand a load experienced between the face 22 of the golf club head 10 and a golf ball at the desired swing speed of at least 50 mph.

Additionally, by way of one non-limiting example, the working strength of the adhesive material 68 may be achieved when the adhesive material 68 is at roughly 60% of the strength exhibited when the adhesive material 6 is at the full cure. It should be appreciated, however, that the working strength of the adhesive material 68 may be attained when the adhesive material 68 is at different percentage of the full cure, so long as the adhesive retaining strength of the adhesive joint 18, alone, is sufficient to withstand the load experienced between the face 22 of the golf club head 10 and a golf ball, at the desired swing speed. Therefore, once the adhesive material 68 is fully cured, the adhesive retaining strength is at a maximum, i.e., at its final bond strength.

Conversely, since the mechanical joint 16 is only configured to exhibit a mechanical retaining strength that is suitable to hold the polymeric section 14 relative to the metallic section 12 during assembly and shipping of the club head 10, the mechanical retaining strength of the mechanical joint 16, alone, is not configured to be capable of withstanding a load experienced by the club head 10 when impacting the face 22 and a golf ball with a swing speed of at least 50 mph.

Referring again to FIGS. 3, 3A, and 4, the mechanical joint 16 and the adhesive joint 18 are shown. The mechanical joint 16 is shown as being formed via a mechanical engagement between the polymeric section 14 and the metallic section 12. The rear wall 28 of the metallic section 12 defines an opening 36 and includes a receiving portion 38 that at least partially surrounds the opening 36. The receiving portion 38 is recessed within the rear wall 28 and includes a peripheral wall 44 and a ledge 40. The peripheral wall 44 extends inwardly from the rear wall 28, toward the face 22, to present an inwardly facing surface 46. The ledge 40 extends generally perpendicularly from the peripheral wall 44 to present an outwardly facing surface 42, configured to support the polymeric section 44.

With continuing reference to FIGS. 3, 3A, and 4, the polymeric section 14 includes a first surface 50 and a second surface 52, opposing the first surface 50. An outer wall 54 extends between the first and second surfaces 50, 52 to surround the polymeric section 14.

The adhesive material 68 is applied to the outwardly facing surface 42, the inwardly facing surface 46, and/or the first surface 50 before the polymeric section 14 is positioned in the receiving portion 38 to cover the opening 36. After the polymeric section 14 is positioned in the receiving portion 38 to cover the opening 36, the adhesive material 68 may be disposed between the first surface 50 and/or the outer wall 54 of the polymeric section 14 and the corresponding outwardly facing surface 44 of the ledge 40 and/or the inwardly facing surface 46 of the peripheral wall 44 to form the adhesive joint 18 therebetween.

With specific reference to FIGS. 1, 2, 3, 3A, 4, and 5, the peripheral wall 44 of the metallic section 12 may include at least one first retention feature 48 and the outer wall 54 of the polymeric section 14 may include at least one second retention feature 56. After the polymeric section 14 is inserted within the receiving portion 38 to cover the opening 36, each first retention feature 48 may be disposed in corresponding relationship to each second retention feature 56, such that the first and second retention features 48, 56 mechanically engage one another to form the mechanical joint 16 therebetween, i.e., interlock with one another. As shown in FIGS. 1 and 2, the club head 10 may include more than one mechanical joint 16, i.e., one mechanical joint 16 for each corresponding first and second retention feature 48, 56.

Figure 5:
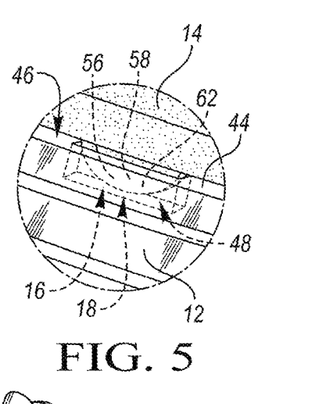
FIG. 5 schematic enlarged perspective view of the area marked "FIG. 5" provided in FIG. 1.

The first and second retention features 48, 56 may be protrusions, recesses, detents, grooves, slots, and the like, formed into, or on, the respective peripheral wall 44 and outer wall 54. As best shown in FIGS. 2, 3A, and 5, the first retention features 48 may be slots and the second retention features 56 may be protrusions 58. The protrusions 58 are illustrated as having a hemispherical shape. It should be appreciated that the first and second retention features 48, 56 of FIGS. 1-5 are schematically illustrated and are not intended to be shown in scale. Therefore, the first and second retention features 48, 56 are actually configured to provide a sufficient interference to allow for the compressibility of the polymeric material of the polymeric section 14 when snapping or attaching the polymeric section 14 to the metallic section 12 to form the mechanical joint 16. As such, in one configuration, the interference may be between approximately 0.01 and 0.02 millimeters (mm). However, other interferences are also possible, and may be a function of the material properties of the polymeric material of the polymeric section 14.

Alternatively, the mechanical joint 16 may be formed via an interference fit between the metallic and polymeric sections 12, 14. More specifically, in one embodiment, the peripheral wall 44 of the metallic section 12 and the outer wall 54 of the polymeric section 14 may be sized to interference with one another and provide an interference fit therebetween. As previously described, the interference may be between 0.01 and 0.02 mm, but other interferences are also possible, and would be a function of the material properties of the polymeric material of the polymeric section 14.

As previously described, the mechanical retaining strength, provided by the mechanical joint 16, alone, is greater than the adhesive retaining strength, provided by the adhesive joint 18, alone, up until the adhesive material 68 is at least partially cured. Thus, the mechanical joint 16 is configured to provide enough retaining strength to prevent separation of the polymeric section 14 from the metallic section 12 at the time of assembly and shipment, such that fixtures, jigs, etc. may not be required. Then, once the adhesive material 68 is at least partially cured, the adhesive retaining strength, alone, is at least equal to the mechanical retaining strength, provided by the mechanical joint(s) 16, alone. As the adhesive material 68 continues to cure, the adhesive retaining strength of the adhesive material 68 increases and becomes even greater than the mechanical retaining strength of the mechanical joint 16, alone.

Figure 6:
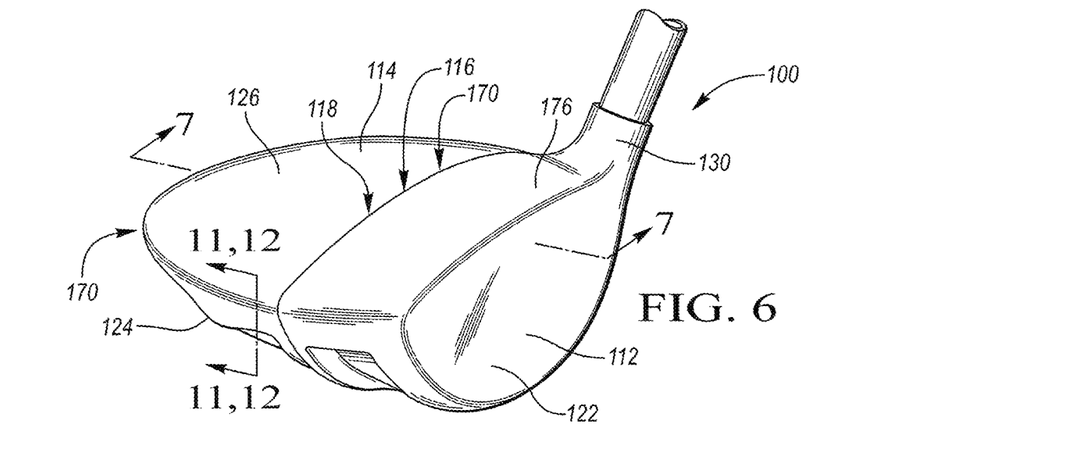
FIG. 6 is a schematic perspective view of a wood-type golf club head.
Figures 7, 8, 9:
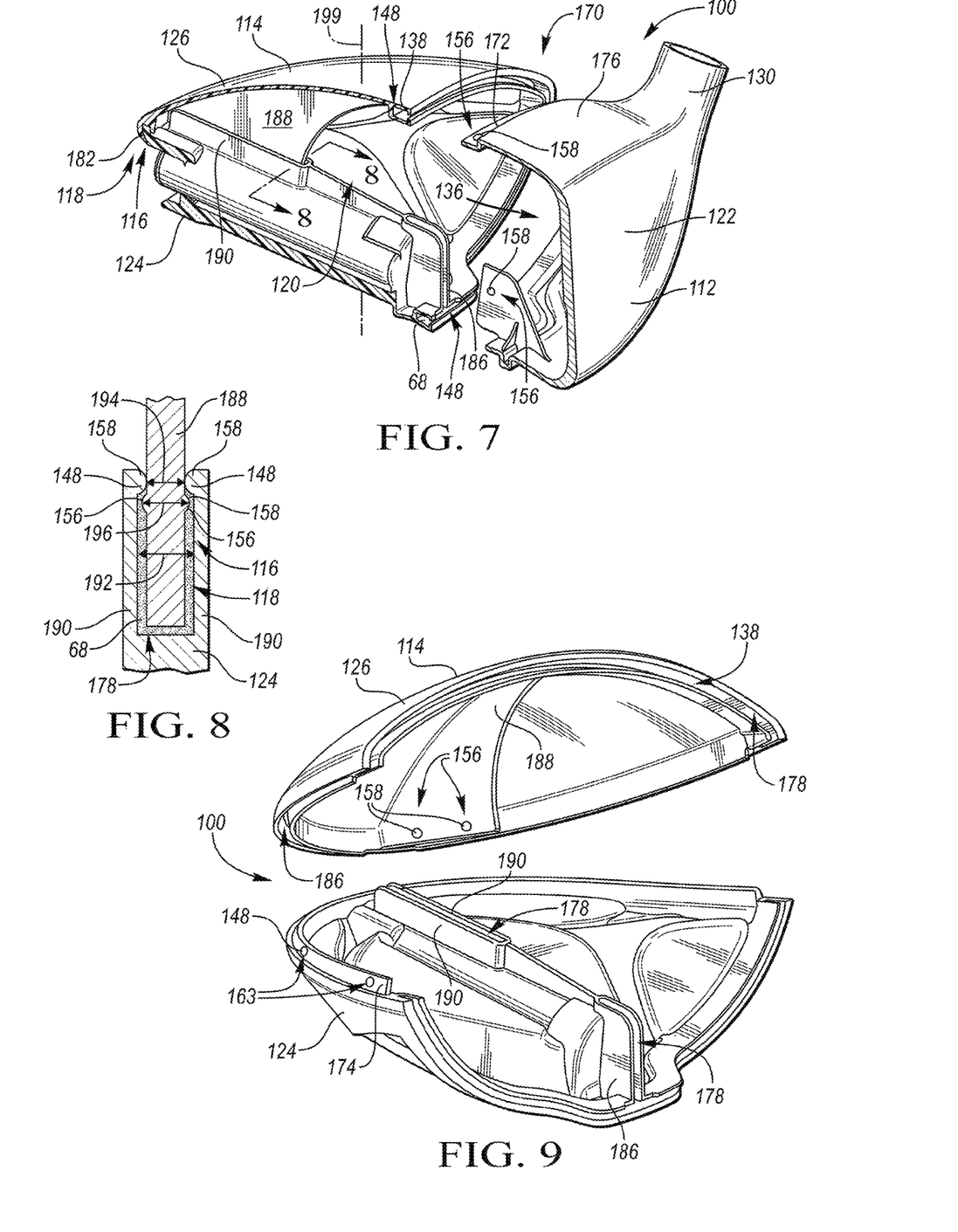
FIG. 7 is a schematic exploded cross-sectional side view of the golf club head of FIG. 6, taken along line 7-7.
FIG. 8 is a schematic partial cross-sectional side view of the golf club head of FIG. 7, taken along line 8-8.
FIG. 9 is a schematic exploded view of the polymeric section of the golf club head provided in FIG. 6.
Figure 10:
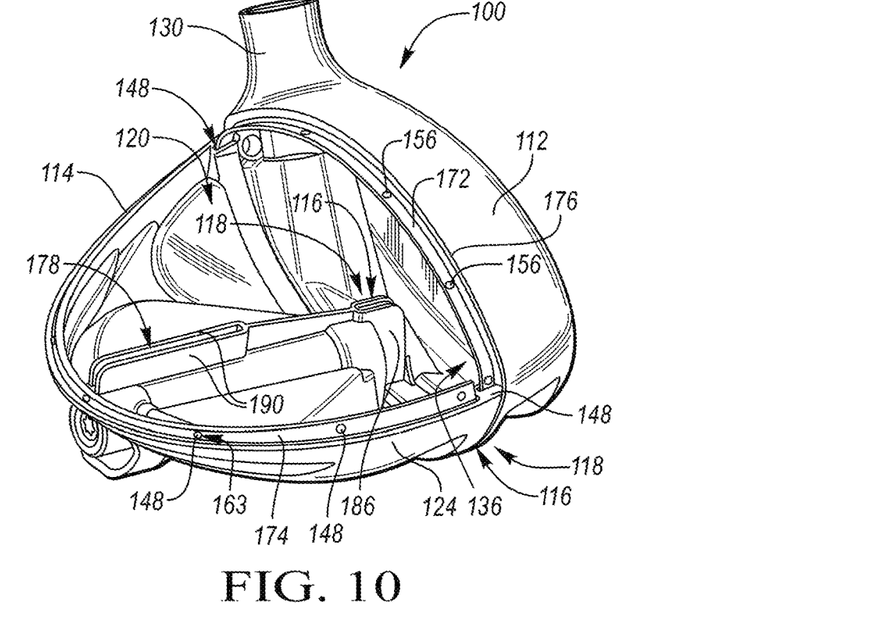
FIG. 10 is a is a schematic perspective view of a lower portion of a polymeric section of a golf club head affixed to a metallic section of the golf club head.

Referring now to the design illustrated in FIGS. 6-12, another embodiment of the golf club head is shown at 100. The club head 100 is a wood-type golf club head 100 that includes a metallic section 112 and a polymeric section 114. The metallic section 112 defines an opening 136. The polymeric section 114 covers the opening 136 and is attached to the metallic section 112 along a seam 170 such that at least one mechanical joint 116 and at least one adhesive joint 118 is formed between the sections 112, 114. Referring to FIGS. 7 and 10, a closed internal cavity 120 is defined between the metallic section 112 and the polymeric section 114.

As generally illustrated in FIG. 6, the metallic section 112 includes a face 122, a frame 176 that surrounds the face 122, and a hosel 130 that extends from the frame 176. Referring now to FIGS. 7 and 10, the metallic section 112 includes a flange 172 that extends from the frame 176 to surround the opening 136. The hosel 130 is configured to receive a shaft adapter or otherwise couple with an elongate shaft to be gripped by a golfer. The face 122 is intended to impact a golf ball during a golf swing. Because an impact with a golf ball can generate considerably large stresses near the point of impact of the club head 10 with the golf ball, the metallic section 112 is formed from one or more metallic materials that are suitable to withstand any expected impact loading. Examples of suitable material may include, but are not limited to, various alloys of stainless steel or titanium. The face 122 may be integrally formed with the frame 176, or else, may be separately fabricated and affixed to the frame 176 through, for example, welding, brazing, gluing, and the like.

With reference to FIGS. 7, 9, and 10, the polymeric section 114 includes a sole 124 and a topline ("crown 126"). The polymeric section 114 is formed from a polymeric material, as previously described with respect to the club head 10 of FIGS. 1-5. The polymeric section 114 includes a receiving portion 186 corresponding to at least a portion of the flange 172. The receiving portion 186 of the polymeric section 114 is configured to be attached to the flange 172 of the metallic section 112 such that at least one mechanical joint 116 and at least one adhesive joint 118 is formed between the sections 112, 114.

The receiving portion 186 of the polymeric section 114 includes a first retention feature 148 configured to mate with the flange 172. In one non-limiting example, the first retention feature 148 may be a channel, or other relief, configured to receive the flange 172 in a tongue-in-groove style. As such, the flange 172 is received by the first retention feature 148 to form the mechanical joint 116, which exhibits a mechanical retaining strength. Therefore, the receiving portion 186 and the flange 172 may be sized so as to provide an interference fit therebetween. It should be appreciated that while the flange 172 is illustrated and described as being provided on the metallic section 112 and the receiving portion 138 is illustrated as being provided on the polymeric section 114, as shown in FIGS. 7, 9, and 10, the flange 172 may also be provided on the polymeric section 114 and the receiving portion 138 may be provided on the metallic section 112 to form the mechanical joint 116.

Referring again to FIGS. 7 and 10, in one non-limiting example, the flange 172 includes at least one second retention feature 156, such as, tabs, nubs, projections, and the like, that extend from at least one side of the flange 172. Accordingly, the first and second retention features 148, 156 may be sized to provide an interference fit therebetween when the flange 172 is disposed within first retention feature 148 of the polymeric section 114, such that the mechanical joint 116 formed.

Additionally, the adhesive joint 118 is formed when an adhesive material 68 is disposed between the metallic section 112 and the polymeric section 114. In the embodiment shown in FIG. 7, the adhesive material 68 is disposed within the retention feature 148 of the polymeric section 114, such that the adhesive material 68 is disposed between the retention feature 148 and the flange 172. It should be appreciated that the adhesive material 68 is not limited to being disposed within the retention feature 148 and the flange 172, as the adhesive material 68 may be disposed in other locations, to form the adhesive joint 118 and adhere the polymeric section 114 to the metallic section 112.

As previously discussed, the adhesive joint 118 exhibits an adhesive retaining strength that increases as a function of the amount of cure of the adhesive material 68. Therefore, the mechanical retaining strength of the mechanical joint 116, alone, is greater than the adhesive retaining strength of the adhesive joint 118, alone, only until the point in time when the adhesive material 68 is partially cured. Hence, once the adhesive material 68 is partially cured, the adhesive retaining strength of the adhesive joint 118, alone, becomes sufficient to prevent the polymeric section 114 from being detached from the metallic section 112 when the face 122 of the club head 100 experiences a load from impact with a golf ball at a desired swing speed.

With continued reference to the polymeric section 114 shown in FIGS. 7 and 9-12, the club head 100 may include other mechanical and adhesive joints 116, 118. With specific reference to FIG. 9, the polymeric section 114 may be a multi-piece construction including the crown 126 and the sole 124. The crown 126 and the sole 124 may be joined together in a clamshell-style arrangement to define at least a portion of the internal cavity 120. With reference to FIG. 7, the sole 124 and the crown 126 meet at a body seam 182 that extends around a portion of a perimeter of the polymeric section 114. In one configuration, the body seam 182 may approximately divide the polymeric section 114 in half. While FIG. 9 illustrates a body design that includes two portions/components, other designs may include three or more components.

Referring now to FIGS. 7, 8, 11, and 12, various portions of the polymeric section 114 may be affixed together to form at least one mechanical joint 116 and at least one adhesive joint 118 therebetween, by employing a similar tongue-in-groove style joint as between the metallic section 112 and the polymeric section 114, as described above. Such a design may promote alignment of the upper and lower portions 24, 26 with one another and maximize a total bond surface area such that the adhesive joint 118 resists removal, via sheer strength, once the adhesive material 68 of the adhesive joint 118 has at least partially cured.

It should be appreciated, however, that the mechanical joint 116 between the polymeric sections 124, 126 is not limited to being a tongue-in-groove style joint, as other mechanical joints 116 may also be employed. Such, mechanical joints 116 may be formed, for example, by employing a dowel pin to provide a dowel-in-hole style joint, a retaining clip to provide a clip-in-hole style joint, and/or the like. A clip-in-hole style joint may be formed using a retaining clip, such as a Christmas tree style clip that extends from one of the sections and provides a low insertion force with a high extraction force. Further, barbs disposed along a post of the Christmas tree style clip may be configured to provide positive feedback to an operator, in the form of a clicking noise, as the clip is inserted into a corresponding hole in the opposite section. Additionally, using a dowel pin or a retaining clip promotes alignment between the corresponding sections by virtue of having to align the dowel or retaining clip with the corresponding hole in the corresponding section. It should also be appreciated that the dowel-in-hole style joint and the clip-in-hole style joints are not limited to being employed between the polymeric sections 124, 126, but may also be employed between the metallic section 112 and the polymeric section 114.

Figure 11:
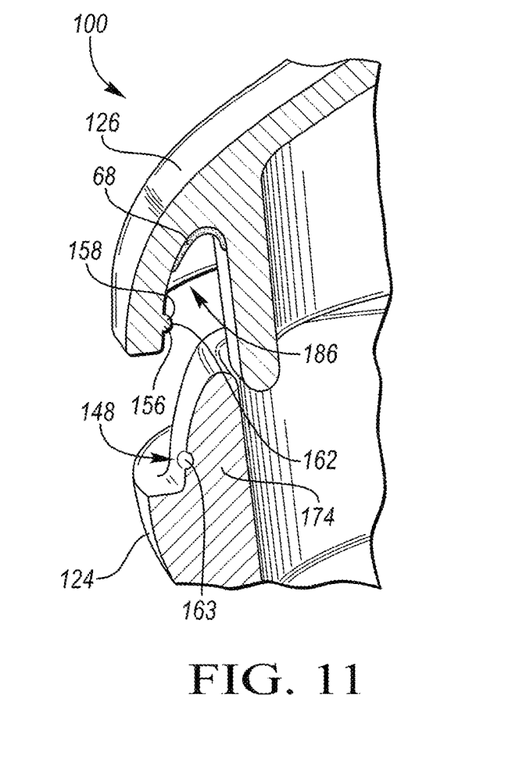
FIG. 11 is a schematic exploded partial cross-sectional side view of the polymeric section of the golf club head of FIG. 6, taken along line 11-11.
Figure 12:
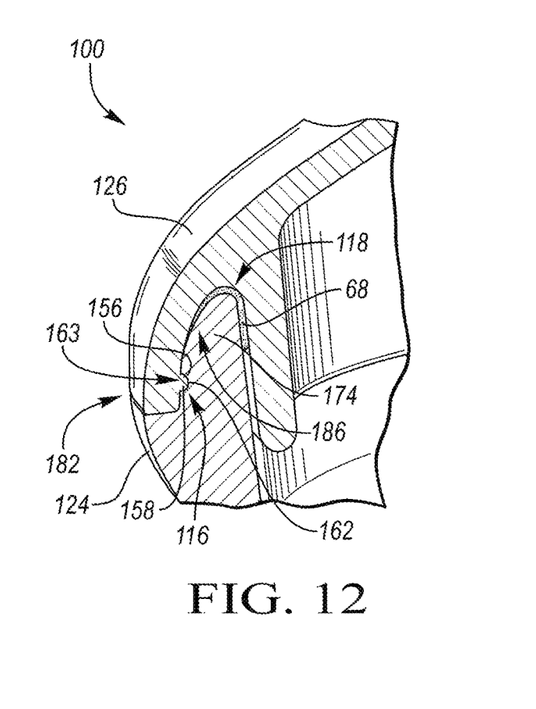
FIG. 12 is a schematic partial cross-sectional side view of the polymeric section of the golf club head of FIG. 6, taken along line 12-12.

In the embodiment shown in FIGS. 7 and 9-12, the body seam 182 includes a mechanical joint 116 and/or an adhesive joint 118. More specifically, the sole 124 includes a lip 174 that extends within a mating receiving portion 186 of the crown 126 to form the body seam 182. FIGS. 11 and 12 provide cross-sectional views of the body seam 182 to more clearly illustrate the lip 174 and receiving portion 186. FIG. 11 illustrates the crown 126 spaced from the sole 124, where the crown 126 has adhesive material 68 disposed thereon. FIG. 12 illustrates the crown 126 secured to the sole 124 to form the mechanical joint 116 and the adhesive joint 118 therebetween.

With continued reference to FIGS. 11 and 12, the receiving portion 186 may also include at least one nub 162 and the lip 174 may include at least one recess 163. When the lip 174 of the sole 124 extends within the receiving portion 186 of the crown 126, the nub 162 is received within the corresponding recess 163, to interlock the crown 126 to the sole 124, and form the mechanical joint 116 therebetween. Further, the adhesive material 68 may be disposed between the lip 174 and the receiving portion 186 to provide the adhesive joint 118 therebetween. It should be appreciated that the mechanical joint 116 is not limited to having the nub 162 being formed on the crown 126 and the recess 163 being defined in the lip 174 of the sole 124, as any other suitable arrangement to provide the mechanical joint 116 may also be employed, so as to secure the crown 126 to the sole 124 until the bonding adhesive 68 is at least partially cured, as described above.

Referring to FIGS. 7-10, the crown 126 of the polymeric section 114 may further include a support flange 188 that extends into the internal cavity 120 and into a channel 178 defined by the sole 124. More specifically, by way of non-limiting example, the sole 124 may include a pair of spaced walls 190 that define the channel 178 therebetween. The support flange 188 may serve as a reinforcing strut that is operative to stiffen the club head 100 (e.g., increase one or more modal frequencies) or to allow one or both of the crown 126 and the sole 124 to be made thinner and/or lighter, while still maintaining at least a desired minimum stiffness. The support flange 188 may either directly extend out from the body seam 182 into the internal cavity 120, or, may more generally lie in a plane that intersects the body seam 182

In the design provided in FIGS. 7-10, the support flange 188 may extend into the channel 178 such that a mechanical joint 116 and/or an adhesive joint 118 are formed therebetween. Similar to the mechanical and the adhesive joints 116, 118 already described, the support flange 188 may be secured and adhered using a tongue-in-groove-style joint that maximizes bond surface area to prevent removal, primarily via sheer strength, once the adhesive material 68 is fully cured.

Referring specifically to FIG. 8, the support flange 188 of FIGS. 7 and 9 extends into the channel 178 that is defined between the two spaced walls 190. The adhesive material 68 may be disposed in the channel 178, prior to insertion of the support flange 188, such that an adhesive joint 118 is formed therebetween.

Further, the walls 190 are spaced a first distance 192 from one another. The support flange 188 may be configured to have a thickness that is at least equal to the first distance 192 of the spaced walls 190. As such, when the support flange 188 is inserted between the walls 190, an interference fit results, thus forming a mechanical joint 116 therebetween. By way of a non-limiting example, the thickness 194 may be slightly larger than the first distance 192, e.g., between 0.01 and 0.02 mm.

Additionally, referring to the embodiment, shown in FIG. 8, the walls 190 are spaced a first distance 192 from one another. The walls 190 may include a first retention feature 148 and the support flange 188 may include a second retention feature 156. The first retention feature 148 of the walls 190 may be at least one protrusion 158 that extends into the channel 178. The second retention feature 156 of the support flange 188 may similarly include at least one protrusion 158. Referring to the design provided in FIG. 8, two projections 158 extend from the walls 190 in facing relationship to one another, such that the two projections 158 are spaced a first distance 194 from one another. Likewise, the projections 158 extend from the support flange 188 such that a thickness 196 is defined between the opposing projections 158 of the support flange 88. There first distance 194 is configured to be less than the thickness 196 such that when the support flange 188 is inserted into the channel 178, there is no clearance between the protrusions 158 of the support flange 188 and the protrusions of the walls 190. Therefore, as the support flange 188 is being inserted into the channel 178, the walls 190 of the receiving portion 138 and/or the protrusions 158 of the support flange 188 temporarily deform to allow the protrusions 158 of the support flange 188 move past the respective protrusions 158 of the walls 190 to enter the channel 178 and form the mechanical joint 116 therebetween.

Additionally, adhesive material 68 may be disposed within the channel 178 before insertion of the support flange 88 to also form the adhesive joint 118 therebetween.

Figure 13:
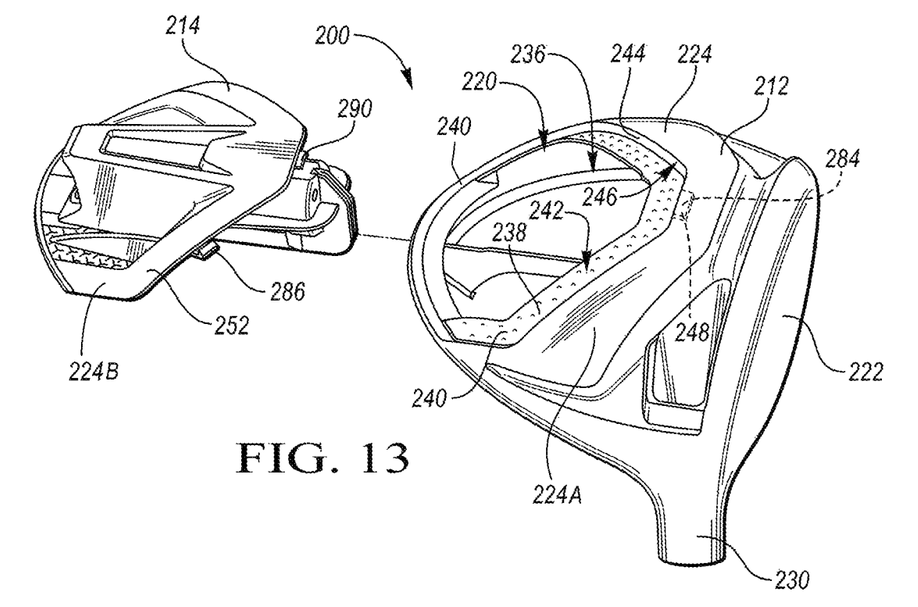
FIG. 13 is a schematic exploded perspective bottom view of another wood-type golf club head having a metallic section and a polymeric section.
Figure 14:
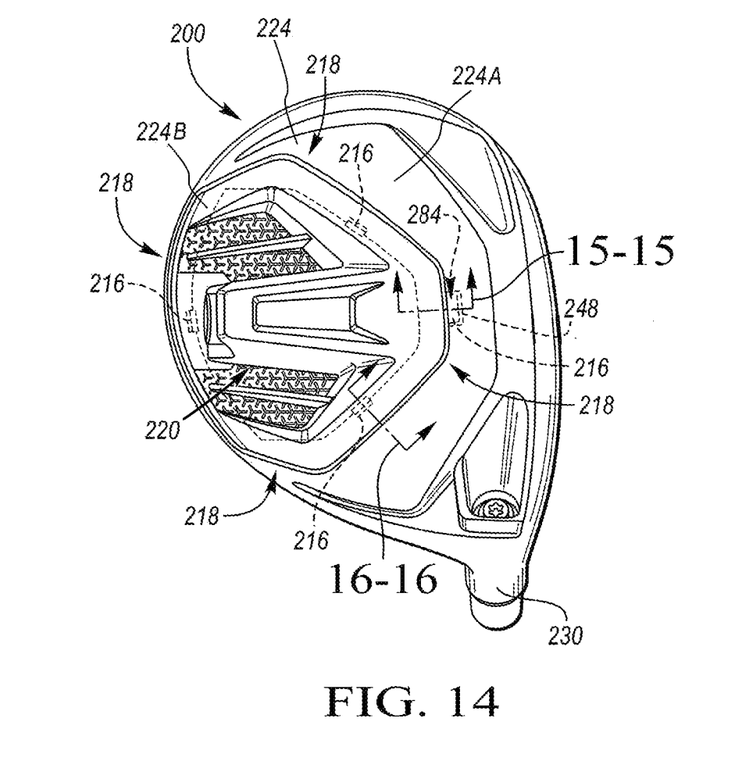
FIG. 14 is a schematic perspective bottom view of the golf club head of FIG. 13.

Referring now to the design illustrated in FIGS. 13-17, another embodiment of the golf club head is shown at 200. The golf club head 200 is another hollow wood-type golf club head 200, as described above, that includes a first section ("metallic section" 212) and a second section ("polymeric section" 214). The metallic section 212 defines an opening 236. The polymeric section 214 covers the opening 236 and is attached to the metallic section 212 such that at least one mechanical joint 216 and at least one adhesive joint 218 is formed between the sections 212, 214. Referring to FIG. 14, a closed internal cavity 220 is defined between the metallic section 212 and the polymeric section 214.

Referring to FIG. 13, the club head 200 includes a face 222, a sole 224, and a hosel 230. More specifically, the metallic section 212 of the club head 200 includes the face 222, a first portion 224A of the sole 224, and the hosel 230. The metallic section 212 may be formed from a light-weight metal alloy, as described above.

With continued reference to FIG. 13, the first portion 224A of the sole 224 of the metallic section 212 may define the opening 236, and the polymeric section 214 is configured to cover the opening 236. The polymeric section 214 may include a second portion 224B of the sole 224 such that when the polymeric section 214 is received in the opening 236, the second portion 224B and the first portion 224A combine to provide the entire sole 224.

With continued reference to FIG. 13, the metallic section 212 includes a receiving portion 238 that extends relative to the first portion 224A of the sole 224, to at least partially surround the opening 236. The receiving portion 238 is configured to support the polymeric section 214, when the polymeric section 214 covers the opening 236. The receiving portion 238 may include a peripheral wall 244 that extends generally perpendicularly from the first portion 224A of the sole 224 and presents an inwardly facing surface 246. A ledge 240 extends generally perpendicularly from the peripheral wall 244 to at least partially surround the opening 236.

The polymeric section 214 may be a polymeric component that is attached to the metallic section 212 in a manner that provides a mechanical joint 216 and an adhesive joint 218. Referring to FIGS. 13 and 17, the polymeric section 214 includes a first surface 250 and a second surface 252, opposing the first surface 250. The polymeric section 214 is sized to fit within the recessed portion of the sole 224 to cover the opening 236 of the metallic section 212, such that at least a portion of the first surface 250 is operatively supported by the outwardly facing surface 242 of the ledge 240, as shown in FIGS. 15 and 16.

With reference to FIGS. 13-16, the peripheral wall 244 may include at least one first retention feature 248. More specifically, the first retention feature 248 may be a slot 284, defined by the peripheral wall 244. In the present design, the flange may also act as a first retention feature 248, as explained in more detail below.

Referring to FIG. 17, the first surface 250 includes a plurality of second retention features 256. One or more of the second retention features 256 may be a tab 290 extending generally longitudinally from a perimeter of the second portion 224B of the sole 224. The tab 290 corresponds to the slot 284 defined in the peripheral wall 244 of the metallic section 212. Likewise, a plurality of cantilever snap-fits 286 may extend from the perimeter of the second portion 224B of the polymeric section 214. More specifically, in one embodiment, the cantilever snap-fits 286 may extend generally perpendicularly from the second surface 250 of the polymeric section 214. The snap-fits 286 are configured to correspond with an inner edge 288 of the ledge 240. Referring to FIGS. 16 and 17, three snap-fits 286 extend from the second surface 250 in spaced relationship to one another. It should be appreciated that the number of snap-fits 286 may be more or less than the four illustrated in the present design. Each snap-fit 286 includes a beam 288 that extends from the second surface 252 to a head 289. An undercut 290 is defined between the beam 288 and the head 289.

Figure 15:
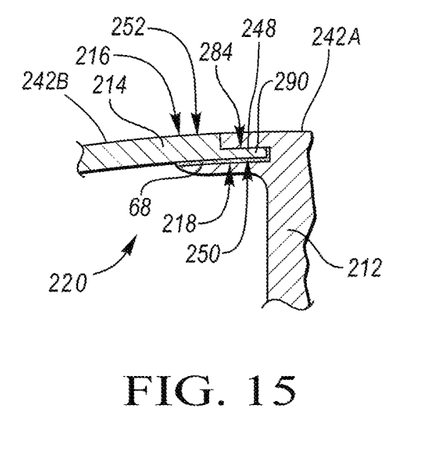
FIG. 15 is a schematic partial cross-sectional side view of the golf club head, taken along line 15-15 of FIG. 14.
Figure 16:
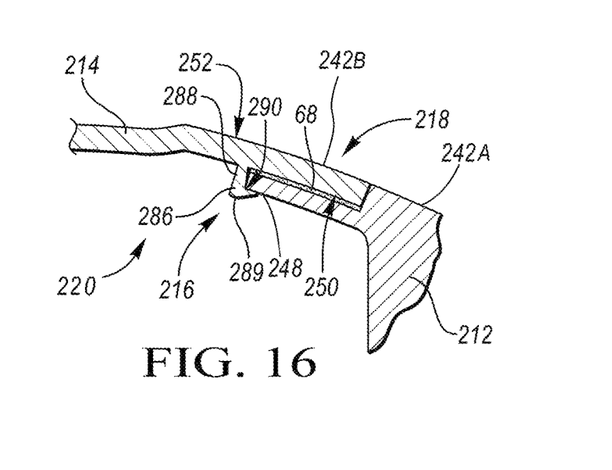
FIG. 16 is a schematic partial cross-sectional side view of the golf club head, taken along line 16-16 of FIG. 14.
Figure 17:
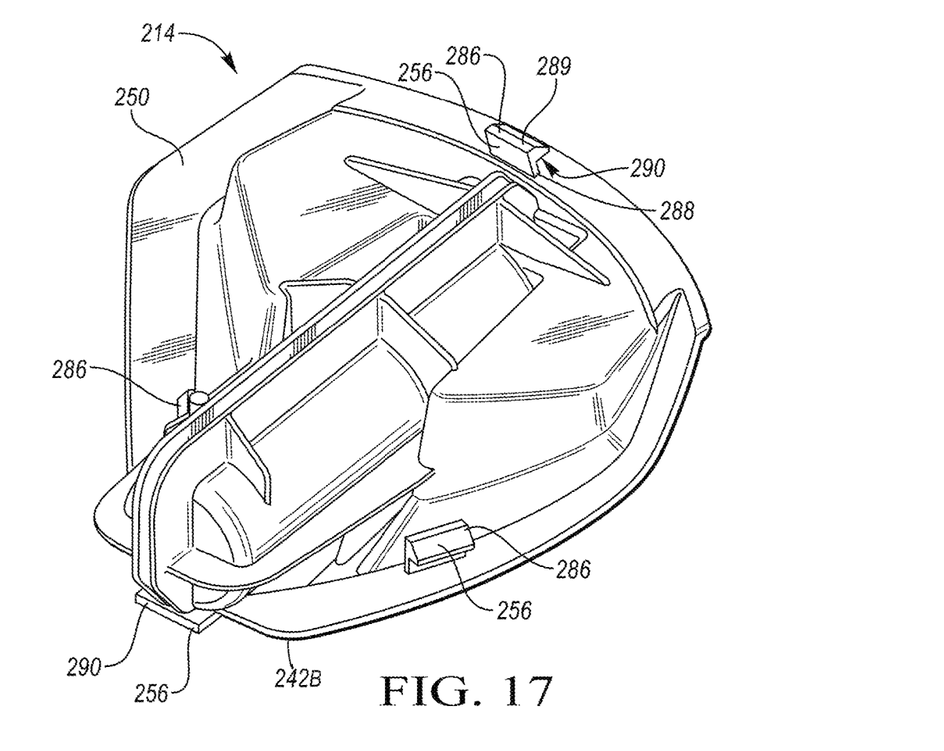
FIG. 17 is a schematic perspective view of an underside of the polymeric section provided in FIG. 13.

Referring to FIGS. 15 and 16, during assembly of the club head 200, the polymeric section 214 is oriented relative to the metallic section 212 such that the tab 290 is aligned with, and then inserted into, the slot 284 of the metallic section 212. Next, the polymeric section 214 is pivoted relative to the slot 284 until the head of each snap-fit 286 contacts the ledge 240. A force from the contact causes the head 289 of the snap-fit 286 to deflect, such that the head 289 moves around the ledge 240 until the undercut 290 engages an underside 292 of the ledge 240, opposite the sole 224, to form a mechanical joint 216 therebetween. Therefore, the polymeric section 214 may be forced toward the metallic section 212 until all of the snap-fits 286 are engaged with the underside 292 of the ledge 240, to form four mechanical joints 216.

As generally shown in FIG. 14, the polymeric section 214 may be secured to the metallic section 212 such that the polymeric section 214 entirely covers the opening 236. The mechanical and adhesive joints 216, 218 are formed, thus providing the same functionality and the same benefits, as described previously with respect to the mechanical and adhesive joints 16, 18 of FIGS. 1-5.

Additionally, prior to mechanically attaching the polymeric section 214 to the metallic section 212 to form the mechanical joints 216, the adhesive material 68 is disposed on the metallic section 212 and/or the polymeric section 214 such that the adhesive material 68 becomes disposed between the polymeric section 214 and the metallic section 212 when the polymeric section 214 is mechanically attached to the metallic section 212. In the embodiment shown in FIGS. 13-17, the adhesive material 68 is disposed within the receiving portion 238 of the metallic section 212, such that the adhesive material 68 is disposed between the ledge 240 of the receiving portion 238 and the first surface 250 of the polymeric section 214. It should be appreciated that the adhesive material 68 is not limited to being disposed within the within the receiving portion 238, as the adhesive material 68 may be disposed in other locations, to form the adhesive joint 218 and adhere the polymeric section 214 to the metallic section 212.

As previously discussed, the adhesive joint 218 exhibits an adhesive retaining strength that increases as a function of the amount of cure of the adhesive material 68. Therefore, the mechanical retaining strength of the mechanical joints 216, alone, is greater than the adhesive retaining strength of the adhesive joint 218, alone, only until the point in time when the adhesive material 68 is partially cured. Hence, once the adhesive material 68 is partially cured, the adhesive retaining strength of the adhesive joint 218, alone, becomes sufficient to prevent the polymeric section 214 from being detached from the metallic section 212 when the face 222 of the club head 200 experiences a load from impact with a golf ball at a desired swing speed.

It should be appreciated that the disclosure is not limited to the mechanical joints described and illustrated herein, as other types of mechanical joints are also contemplated, such that the mechanical joints have a mechanical strength that is less than the adhesive strength when the adhesive material 68 is at least partially cured. Some of the other contemplated mechanical joints include, but are not limited to, a post press-fit into a hole defined in a boss.

Further, it should be appreciated that the first and second retention features shown in the Figures are schematically illustrated and are not intended to be shown to scale. Therefore, the first and second retention features are actually configured to provide a sufficient interference to allow for the compressibility of the material of the polymeric section when snapping (i.e., interlocking, press-fitting, and the like) the polymeric section onto the metallic section and/or when snapping the upper section to the lower section. Therefore, in one embodiment, the interference between the first and second retention features may be between approximately 0.01 and 0.02 millimeter. However, other interferences are possible, and are a function of the material properties of the polymeric section 14.

"A," "an," "the," "at least one," and "one or more" are used interchangeably to indicate that at least one of the item is present; a plurality of such items may be present unless the context clearly indicates otherwise. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range. Each value within a range and the endpoints of a range are hereby all disclosed as separate embodiment. The terms "comprises," "comprising," "including," and "having," are inclusive and therefore specify the presence of stated items, but do not preclude the presence of other items. As used in this specification, the term "or" includes any and all combinations of one or more of the listed items. When the terms first, second, third, etc. are used to differentiate various items from each other, these designations are merely for convenience and do not limit the items.

The invention claimed is:

1. A golf club head for a golf club, the golf club head comprising:
a metallic section including a face and a frame, the face and frame defining a first opening, and the frame projecting from the face and extending continuously around the first opening;
a polymeric section extending over and covering the first opening, the polymeric section including a sole and a crown that cooperatively define a second opening;
an adhesive material disposed between the metallic section and the polymeric section forming an adhesive joint therebetween, the adhesive joint binding the polymeric section to the metallic section; and
a mechanical joint interposed between and mechanically coupling the metallic and polymeric sections, the mechanical joint including a flange protruding from one of the polymeric section or the metallic section, and a channel recessed into the other of the polymeric section or the metallic section, the channel seating therein the flange and the adhesive joint, the channel including first and second adjoining walls at least partially surrounding the flange and the adhesive joint, the flange surrounding the first and second openings, and the channel surrounding the first and second openings, the mechanical joint further including first and second projections protruding from first and second sides, respectively, of the flange, the first and second projections abutting the first and second walls, respectively, to thereby form an interference fit between the channel and the flange.

2. The golf club head, as set forth in claim 1, wherein the adhesive material is configured to cure;
   wherein an adhesive retaining strength of the adhesive joint is configured to be greater than a mechanical retaining strength of the mechanical joint when the adhesive material is at least partially cured; and
   wherein the mechanical joint is operative to hold the polymeric section in attachment with the metallic section until the adhesive material is at least partially cured.

3. The golf club head, as set forth in claim 2, wherein the adhesive retaining strength is configured to be no greater than the mechanical retaining strength of the mechanical joint when the adhesive material is not at least partially cured.

4. The golf club head, as set forth in claim 1, wherein the mechanical joint is operative to mechanically align the polymeric section over the first opening relative to the metallic section.

5. The golf club head, as set forth in claim 1, wherein the metallic section comprises a metallic material and the polymeric section comprises a polymeric material, and wherein the metallic material is selected from the group consisting of a titanium alloy, a steel alloy, a stainless steel, and an amorphous metal alloy.

6. The golf club head, as set forth in claim 5, wherein the polymeric material comprises an injection molded polyamide.

7. The golf club head, as set forth in claim 1, wherein the metallic section includes the flange, and the polymeric section includes the channel.

8. The golf club head, as set forth in claim 1, wherein the metallic section and the polymeric section each includes a retention feature configured to mechanically engage one another to form the mechanical joint therebetween.

9. A wood type golf club head comprising:
   a forward section including a face and a frame, the face and frame defining a first opening, and the frame projecting from the face and extending continuously around the first opening;
   a body bonded to the forward section and covering the first opening, the body including a first polymeric section and a second polymeric section that cooperatively define a second opening;
   an adhesive material disposed between the body and the forward section and between a portion of the first polymeric section and the second polymeric section to form an adhesive joint therebetween, the adhesive joint binding the first polymeric section to the second polymeric section when the adhesive material is at least partially cured; and
   a mechanical joint interposed between and mechanically coupling the body, the forward section, and the first and second polymeric sections, the mechanical joint including a first flange protruding from one of the first polymeric section or the second polymeric section, a second flange protruding from one of the body or the forward section, a first channel recessed into the other of the first polymeric section or the second polymeric section, and a second channel recessed into the other of the body or the forward section, the first channel seating therein the first flange and including adjoining walls at least partially surrounding the first flange, and the second channel seating therein the second flange and including first and second adjoining walls at least partially surrounding the second projection, the second flange surrounding the first and second openings, and the second channel surrounding the first and second openings, the mechanical joint further including first and second projections protruding from first and second sides, respectively, of the second flange, the first and second projections abutting the first and second walls, respectively, of the second channel to thereby form an interference fit therebetween.

10. The golf club head, as set forth in claim 9, wherein an adhesive retaining strength of the adhesive joint is configured to be no greater than a mechanical retaining strength of the mechanical joint when the adhesive material is not at least partially cured.

11. The golf club head, as set forth in claim 9, wherein the first polymeric section and the second polymeric section each comprise an injection molded polyamide material.

12. The golf club head, as set forth in claim 9, wherein the forward section comprises a metallic material selected from a group consisting of a titanium alloy, a steel alloy, stainless steel, and an amorphous metal alloy.

13. The golf club head, as set forth in claim 9, wherein the first and second projections include a first plurality of dimples and a second plurality of dimples, respectively, that mechanically engaged an inner surface of the second channel.

14. The golf club head, as set forth in claim 1, wherein the metallic section further includes a sole adjoining a lower portion of the face, and a topline adjoining an upper portion of the face.

15. The golf club head, as set forth in claim 1, wherein the first and second projections snap-fit into the channel to thereby create the mechanical joint.

16. The golf club head, as set forth in claim 1, wherein the frame is integrally formed with the face, and wherein the sole and crown are mechanically attached together to cooperatively define the second opening.

17. The golf club head, as set forth in claim 16, wherein the flange adjoins and protrudes from the frame, and the adjoining walls of the channel protrude from the polymeric section.

18. The golf club head, as set forth in claim 1, wherein at least a portion of the adhesive material at least partially surrounds the flange.

19. The golf club head, as set forth in claim 1, wherein the first and second projections include a first plurality of dimples and a second plurality of dimples, respectively, that are mechanically engaged with an inner surface of the first and second adjoining walls of the channel.

20. A golf club head for a golf club, the golf club head comprising:
   a metallic section with a face and a frame, the face and frame defining a first opening, and the frame projecting from the face and extending continuously around the first opening, wherein the face is integrally formed with the frame;
   a polymeric section extending across and covering the first opening, the polymeric section including a sole attached to a crown to cooperatively define a second opening;
   a mechanical joint interposed between and coupling the metallic and polymeric sections, the mechanical joint including a flange protruding from the metallic section and a channel defined by the polymeric section, the flange and channel both surrounding the first and second openings, the channel including first and second adjoining walls seating therein the flange, and the flange including first and second projections abutting the first and second walls, respectively, to close off the channel and form an interference fit between the channel and the flange; and an adhesive material disposed inside the channel and at least partially surrounding the flange, the adhesive material forming an adhesive joint between and thereby binding the metallic section and the polymeric section.

\* \* \* \* \*